(12) United States Patent
Ten et al.

(10) Patent No.: US 10,242,264 B1
(45) Date of Patent: Mar. 26, 2019

(54) SYSTEM AND METHOD FOR TRAINING A MACHINE-LEARNING MODEL TO IDENTIFY REAL-WORLD ELEMENTS

(71) Applicant: Imagry (israel) Ltd., Haifa (IL)

(72) Inventors: Sergey Ten, Haifa (IL); Jose Ariel Keselman, Kiryat Tivon (IL); Suhail Habib, Haifa (IL); Abed Abu Dbai, Nazareth (IL); Adham Ghazali, Haifa (IL); Majed Jubeh, Jerusalem (IL); Itai Orr, Or Akiva (IL)

(73) Assignee: IMAGRY (ISRAEL) LTD., Haifa (IL)

( * ) Notice: Subject to any disclaimer, the term of this patent is extended or adjusted under 35 U.S.C. 154(b) by 0 days.

(21) Appl. No.: 15/961,892

(22) Filed: Apr. 25, 2018

(51) Int. Cl.
*G06K 9/00* (2006.01)
*G06F 15/18* (2006.01)
*G06N 3/08* (2006.01)

(52) U.S. Cl.
CPC ......... *G06K 9/00671* (2013.01); *G06F 15/18* (2013.01); *G06K 9/00791* (2013.01); *G06N 3/08* (2013.01)

(58) Field of Classification Search
USPC ........ 382/100, 103, 106, 113, 154–155, 162, 382/168, 173, 181, 199, 206, 219, 224, 382/232, 254, 276, 286–291, 305, 321; 342/25 F; 706/12
See application file for complete search history.

(56) References Cited

U.S. PATENT DOCUMENTS

| | | | | |
|---|---|---|---|---|
| 2015/0296026 | A1* | 10/2015 | Smyth | H04W 4/21 706/12 |
| 2016/0019458 | A1* | 1/2016 | Kaufhold | G01S 7/417 342/25 F |
| 2017/0024877 | A1* | 1/2017 | Versace | G06K 9/00664 |
| 2017/0337682 | A1* | 11/2017 | Liao | G06T 7/30 |
| 2017/0364733 | A1* | 12/2017 | Estrada | G06N 3/04 |

* cited by examiner

*Primary Examiner* — Seyed H Azarian
(74) *Attorney, Agent, or Firm* — Pearl Cohen Zedek Latzer Baratz LLP

(57) ABSTRACT

A method and a system for training a machine-learning model to identify real-world elements using a simulated environment (SE) may include (a) receiving at least one set of appearance parameters, corresponding to appearance of real-world element; (b) generating one or more realistic elements, each corresponding to a variant of at least one real-world element; (c) generating one or more abstract-elements; (d) placing the elements within the SE; (e) producing at least one synthetic image from the SE; (f) providing the at least one synthetic image to a machine-learning model; and (g) training the machine-learning model to identify at least one real-world element from the at least one synthetic image, that corresponds to at least one realistic element in the SE.

17 Claims, 9 Drawing Sheets

SYSTEM AND METHOD FOR TRAINING A MACHINE-LEARNING MODEL TO IDENTIFY REAL-WORLD ELEMENTS

FIELD OF THE INVENTION

The present invention relates generally to computer identification of real-world elements from images and video sequences. More specifically, the present invention relates to using machine-learning models in element identification.

BACKGROUND

Recent years have seen the emerging of machine-learning (ML) models for detection and identification of real-world objects and scenes from still images and video sequences. These models provide the core logic of ubiquitous applications, including, for example: robotic industrial systems, autonomous driving systems, security camera systems, and the like.

The state of the art for training such ML models for identification of real-world elements relies on obtaining diversified real-world data corresponding to real-world elements and classifying and localizing the real-world elements in a manner that is generalized enough so as to correctly classify newly-presented elements according to their appropriate classes. For example, stop road-signs may possess a variety of appearance parameters (e.g.: orientation, color, size, lighting, etc.), but must always be identified by an ML model of an autonomous vehicle as stop road-signs.

Data for ML model training may originate from for example real-world video footage or discrete images and generated synthetic data.

Real-life video footage and discrete images provide a wide diversity for training ML models but require extensive labor including meticulous tagging of each substantial element in the images. This process is therefore slow and tedious. Moreover, training through real-world imagery does not systematically cover every aspect of the appearance of the real-world element. Pertaining to the above example, a stop road-sign may be designed differently in various geographic territories and may appear differently in various lighting conditions.

In contrast, generated synthetic data may train ML models without need for human intervention in tagging different elements, and may therefore be accomplished more quickly than by real-world imagery training. For example, a processor may generate a synthetic image that includes a stop road-sign and present the image to the ML model for training.

One disadvantage of training ML models by synthetic images is that it tends to create real-world element classes that are very specific, according to the elements integrated within the generated images. Pertaining to the stop sign example: only specific designs of stop road-signs that have been integrated within the synthetic image will be included in a "stop sign" class of elements, excluding images of real-world stop signs of other designs from this class.

Another disadvantage of training ML models by synthetic images is that it tends to include irrelevant information in the training. Pertaining to the same example: a synthetic, repetitive background may be associated by the ML model with the appearance of a stop sign in the generated synthetic image and may erroneously influence the classification of stop signs.

A system and a method for training ML models to identify real-world elements from images or video sequences in a manner that is quick, not labor intensive and generalized, and that also takes into account the relevance of specific segments within the image or video sequence is therefore desired.

SUMMARY

Embodiments of the present invention include a method of training a machine-learning model to identify real-world elements using a simulated environment (SE). According to some embodiments, the method may include: receiving, by at least one processor, at least one first set of appearance parameters corresponding to the appearance of at least one real-world element; generating, by the at least one processor, one or more realistic elements, each corresponding to a variant of at least one real-world element, based on the at least one first set of appearance parameters; receiving, by the at least one processor, at least one second set of appearance parameters; generating, by the at least one processor, one or more abstract-elements according to the at least one second set of appearance parameters; creating, by the at least one processor, at least one SE, and placing the one or more realistic elements and abstract elements within the SE; producing by the at least one processor at least one synthetic image from the SE; providing the at least one synthetic image to a machine-learning model; and training the machine-learning model to identify at least one real-world element from the at least one synthetic image that corresponds to at least one realistic element in the SE.

According to some embodiments, producing at least one synthetic image based on at least one point-of-view and in relation to at least one field-of-view.

According to some embodiments, generating each of the plurality of abstract elements further includes applying, by the at least one processor, a random value to at least one parameter of the at least one second set of appearance parameters to generate a variety of abstract elements.

According to some embodiments, generating one or more variants of abstract elements may include applying real-world images, or portions thereof on the one or more variants of the abstract elements.

Embodiments of a method of training a machine-learning model may include: tagging, by the at least one processor, the one or more elements as corresponding to the at least one real-world element; and training the machine-learning model to generalize the plurality of tagged elements and identify at least one element in the SE as corresponding to at least one real-world element.

According to some embodiments, the tagged elements may be realistic elements, and may be selected by the at least one processor from a group consisting one or more of: pedestrians, vehicles, road markings, traffic signs, traffic lights, and road shoulders.

Embodiments of a method of training a machine-learning model may include calculating, by the at least one, processor, at least one road-delimiter through the free-space portion of the SE, based on the location of at least on identified realistic element.

Embodiments of a method of training a machine-learning model may include defining, by the at least one processor, at least one free-space portion and at least one occupied-space portion within the SE, based on the at least one calculated road-delimiter within the SE.

Embodiments of a method of training a machine-leaning model may include placing by the at least one processor at least one element within a free-space portion of the SE;

tagging the at least one element as an obstruction; and redefining the road-delimiter to exclude the obstruction from the free-space portion;

The at least one first and second sets of appearance parameters may include at least one of: a location, a shape, a size, a color, a texture, a pattern, an orientation and a level of transparency.

According to some embodiments, at least one tagged element may include at least one pseudo-realistic element, consisting of at least one substantial portion and at least one non-substantial portion.

Generating at least one pseudo-realistic element may include applying a random value to at least one appearance parameter associated with a non-substantial portion of the at least one realistic element.

Additional embodiments of the present invention may include a method of training a neural network using an SE, method including: generating at least one realistic element and at least one abstract element, and placing the elements in the SE; producing at least one synthetic image from the at least one SE; providing the at least one synthetic image to a neural network; and training the neural network, to detect at least one free-space portion and at least one occupied-space portion in the SE, respectively corresponding to at least one free-space and at least one occupied-space in a non-simulated environment, based on the at least one synthetic image.

According to some embodiments, at least one realistic element may be a realistic-portion, corresponding to at least one free-space in a non-simulated environment, and at least one abstract-element may be an abstract portion, corresponding to at least one occupied-space in a non-simulated environment.

Embodiments of a method of training a neural network using an SE may include tagging at least one realistic-portion within the SE.

Training the neural network to detect at least one free-space portion and at least one occupied-space portion in the non-simulated environment may include training the neural-network to generalize the at least one tagged realistic-portion to detect at least one corresponding free-space in a non-simulated environment.

According to some embodiments, at least one abstract element may include a random shape, having at least one randomly selected appearance parameter, selected from a list consisting of: one or more colors, one or more textures, one or more patterns, one or more orientation, one or more portion of a real-world image and one or more transparency levels.

Embodiments of a method of training a neural network may include: tagging at least one realistic element as corresponding to at least one realistic real-world element, selected from a group consisting of: pedestrians, vehicles, road markings, traffic signs, traffic lights, and road shoulders; and training the neural network to generalize the least one tagged realistic element to identify corresponding elements in a non-simulated environment.

Embodiments of a method of training a neural network may include: placing at least one part of an abstract-element within a realistic-portion; tagging the at least one abstract-element as an obstruction; and training the neural network to generalize the at least one tagged abstract-element to detect corresponding elements in a non-simulated environment.

The tagged elements may include at least one pseudo-realistic element, including a realistic segment and an abstract segment. The method may further include applying a random value to at least one appearance parameter associated with the abstract segment of the at least one pseudo-realistic element.

Embodiments of a method of training a neural network may include generating at least one other SE and checking the trained neural network on the other SE.

Additional embodiments of the present invention may include a system for training a machine-learning model to identify real-world elements using an SE, including a non-transitory memory device, wherein modules of executable code may be stored, and at least one processor associated with the memory device, and configured to execute the modules of executable code, whereupon execution of said executable code, the at least one processor may be configured to perform at least one of: receive at least one first set of appearance parameters corresponding to the appearance of at least one real-world element; generate one or more realistic elements, each corresponding to a variant of at least one real-world element, based on the at least one first set of appearance parameters; receive at least one second set of appearance parameters; generate one or more abstract elements according to the at least one second set of appearance parameters; create at least one SE, and placing the one or more realistic elements and abstract elements within the SE; produce at least one synthetic image from the SE; provide the at least one synthetic image to a machine-learning model; and train the machine-learning model to identify at least one real-world element from the at least one synthetic image that corresponds to at least one realistic element in the SE.

Embodiments of a system for training a machine-learning model to identify real-world elements may include a distributed architecture, comprising a plurality of processors, where execution of the modules of executable code may be performed by at least two of the plurality of processors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
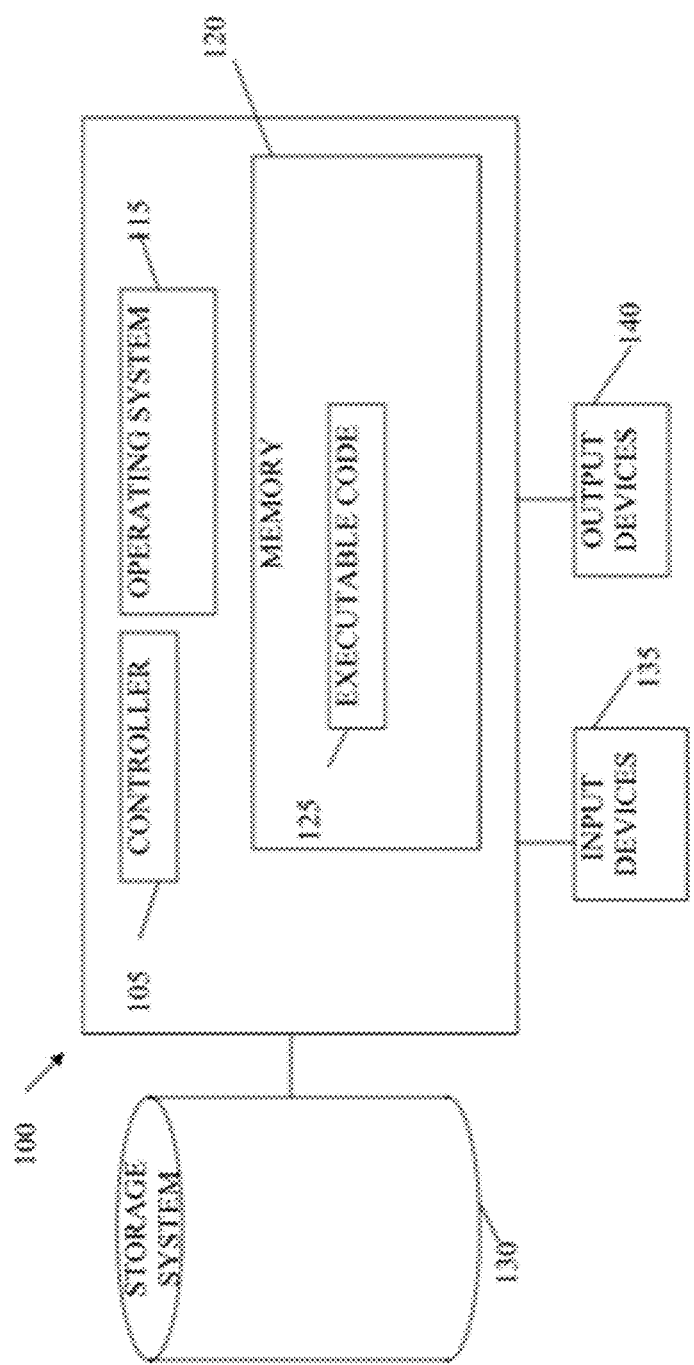
FIG. 1 is a block diagram depicting a computing device for training machine-learning (ML) models to identify real-world elements, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the cal that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a system and a method of training a machine-learning model to identify real-world elements using a simulated environment (SE).

Embodiments of a method for training a machine-learning model may include generating or creating at least one realistic element and at least one abstract-element, and adding or placing the generated elements within an SE. Embodiments may further include: generating a synthetic image based on the SE; propagating the synthetic image to a machine-learning (ML) model; and training the ML model to identify at least one real-world element from the at least one synthetic image.

When discussed herein, data objects such as SE, realistic elements and abstract elements may be data objects stored for example in a memory and database (e.g. element 130 of FIG. 1) and may represent real or simulated real-world objects. The following Table 1 includes a list of terms used herein:

TABLE 1

| | |
|---|---|
| Simulated environment (SE) | A data object that may be stored, for example, in a memory and database (e.g. element 130 of FIG. 1) and may include a 2-demensional (2D) or 3-dimensional (3D) environment representing a real-world scene. An SE may include placement of at least one realistic element and/or at least one abstract element and may be used for training an ML model (e.g. a neural network) to classify and/or identify real-world elements (e.g. road shoulders, sidewalks and trees). |
| Abstract element | A data object that may be included within an SE, and which may be an abstract 2D or 3D graphic representation of a real-world element, and may be stored, for example, in a memory and/or database (e.g. element 130 of FIG. 1). An abstract-element may represent an abstraction of at least one real-world object. For example: an abstract-element representing a tree in the real-world may be randomly shaped and may be colored in a randomly selected greenish hue. This abstraction may be used to efficiently generalize a classification of the at least one real-world element. In the same example, assuming the type of tree is of no interest to a user of the ML model, abstraction of trees may enable correct classification of real-world objects as 'trees', without requiring extensive real-world examples, and manual tagging of tree images to train the ML model. |
| Abstract portion | A data object that may be included within an SE, which may be an abstract 2D or 3D graphic representation of a real-world area or volume, and which may be stored, for example, in a memory arid/or database (e.g. element 130 of FIG. 1). An abstract portion may include one or more abstract-elements within the SE (e.g.: a group of adjacent trees), and/or may include an abstract area or volume within the SE. For example, if the ML model is configured to identify a road, then a sidewalk (and whatever is located thereon) may be represented by an abstract portion within the SE. |
| Realistic element | A data object that may be included within an SE, which may be a realistic 2D or 3D graphic representation of a real-world element, and which may be stored, for example, in a memory and/or database (e.g. element 130 of FIG. 1). Realistic elements may represent variants of elements in the real-world, that are significant to the training of the ML model. For example, if the ML model is configured to identify stop signs, then the realistic elements may include a plurality of realistic appearances of stop signs (e.g. tall and short stop signs, different coloring of stop signs, different designs of stop signs, etc.) Realistic elements may further include a label or tag, associating them with a specific type of real-world element (e.g. a car, a pedestrian, a traffic sign etc.) that may be propagated to the ML model, to assist in classifying realistic elements as real-world objects. |
| Realistic portion | A data object that may be included within an SE, has and which may be a realistic 2D or 3D graphic representation of a real-world area or volume, and may be stored, for example, in a memory and/or database (e.g. element 130 of FIG. 11). Realistic portions may include one or more spatially adjacent realistic elements. Realistic portions may be defined according to a location of at least one realistic element (e.g. a road may be defined as an area limited between two realistic elements representing road-shoulders). |

TABLE 1-continued

Realistic portions may be defined as a realistic area or volume within the SE (e.g. a surface of a road), independent of other elements of the SE.

According to some embodiments, the at least one realistic element may correspond to or describe at least one real-world element. Embodiments may further include generating or creating one or more variants of at least one realistic element, corresponding to one or more variants of the appearance of at least one real-world element. For example, embodiments may comprise generating a plurality of elements, which are variants, corresponding to different appearances of traffic poles (e.g. different number of lights in a traffic pole, different pole design, different pole colors, different ambient lighting, etc.).

According to experimental results, the variation of realistic elements corresponding to variations of real-world element appearance, may contribute to generalizing the classification of real-world elements in the ML model during a stage of ML model training, and may improve the identification of real-world elements after the training stage.

According to some embodiments, a method for training a neural network may include generating or creating one or more variants or alternative versions of abstract elements, for example by applying random or different values to parameters relating to the appearance of the abstract elements (e.g. modifying the parameters by the values or replacing the parameters with the values). For example, abstract-elements may be varied by their shapes (e.g. a sphere, a cloud shape, a random 2D polygon, a random 3D polygon, etc.), colors (e.g.: hue, brightness etc.), texture (e.g.: surface filling by a pattern or a real-world image or a portion thereof), and lighting (e.g. brightness and contrast of one element or a portion thereof in relation to the brightness and contrast of another element or a portion thereof) to each abstract element.

According to experimental results, the random variety of abstract elements in the synthetic image may reduce the influence of irrelevant elements on the training of the ML model. For example, abstract representation of background buildings in the synthetic image may improve the ML, model's training to recognize important elements such as traffic poles. According to some embodiments, a level of randomization to at least one property of an abstract element (e.g. size, color etc.) may be applied during generation of the abstract element, to optimize the ML model's recognition and generalization of abstract elements as irrelevant in the synthetic image.

According to some embodiments, generating or calculating one or more variants or versions of abstract elements may include applying real-world images, or portions thereof on the one or more variants of abstract elements. For example: abstract objects that may represent background elements in a real-world scenery (e.g.: buildings, mountains and the ocean), may include portions of images of respective real-world background elements. These elements (e.g. buildings) may, for example, be constructed as 3-Dimensional polygons, having a texture or a filling of respective real-world images (e.g.: images of portions of real-world buildings).

According to experimental results, filling a surface of abstract elements within the SE with real-world images or portions thereof may accelerate an ML model's training to generalize and recognize background elements in the synthetic image as irrelevant "garbage". In some embodiments, the ratio between the number of abstract elements that are produced with real-world images, and the number of abstract elements that are produced by randomization of at least one property of the abstract element may be set, to optimize the ML model's recognition of real-world background objects as "garbage".

Embodiments of a method of training a neural network may further include defining at least one free-space portion and at least one occupied-space portion within the SE.

Reference is now made to FIG. 1, which is a block diagram depicting a computing device 100, which may include a system for training machine-learning (ML) models to identify real-world elements, according to some embodiments. Computing device 100 may include a controller 105 that may be, for example, a central processing unit processor (CPU), a chip or any suitable computing or computational device, an operating system 115, a memory 120, executable code 125, a storage system 130 that may include a model 136, input devices 135 and output devices 140. Controller 105 (or one or more controllers or processors, possibly across multiple units or devices) may be configured to carry out methods described herein, and/or to execute or act as the various modules, units, etc., as explained further below, in relation to FIG. 5. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be one or more modules of executable code, e.g., an application, a program, a process, task or script. Executable code 125 may be executed by controller 105 possibly under control of operating system 115. For example, executable code 125 may be an application that enforces security in a vehicle as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120. Model 136 may be, or may include, a timing model that includes timing properties of messages, or expected behavior of messages, as described herein. As further described, model 136 may be, or may include, a content model that may include content attributes or properties of messages, or expected content related behavior of messages, as described herein.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units.

According to some embodiments, the system may have a distributed architecture (e.g.: a cloud-based architecture), comprising a plurality of processors. The execution of modules of instruction code is performed by at least two of the plurality of processors.

Figure 2:
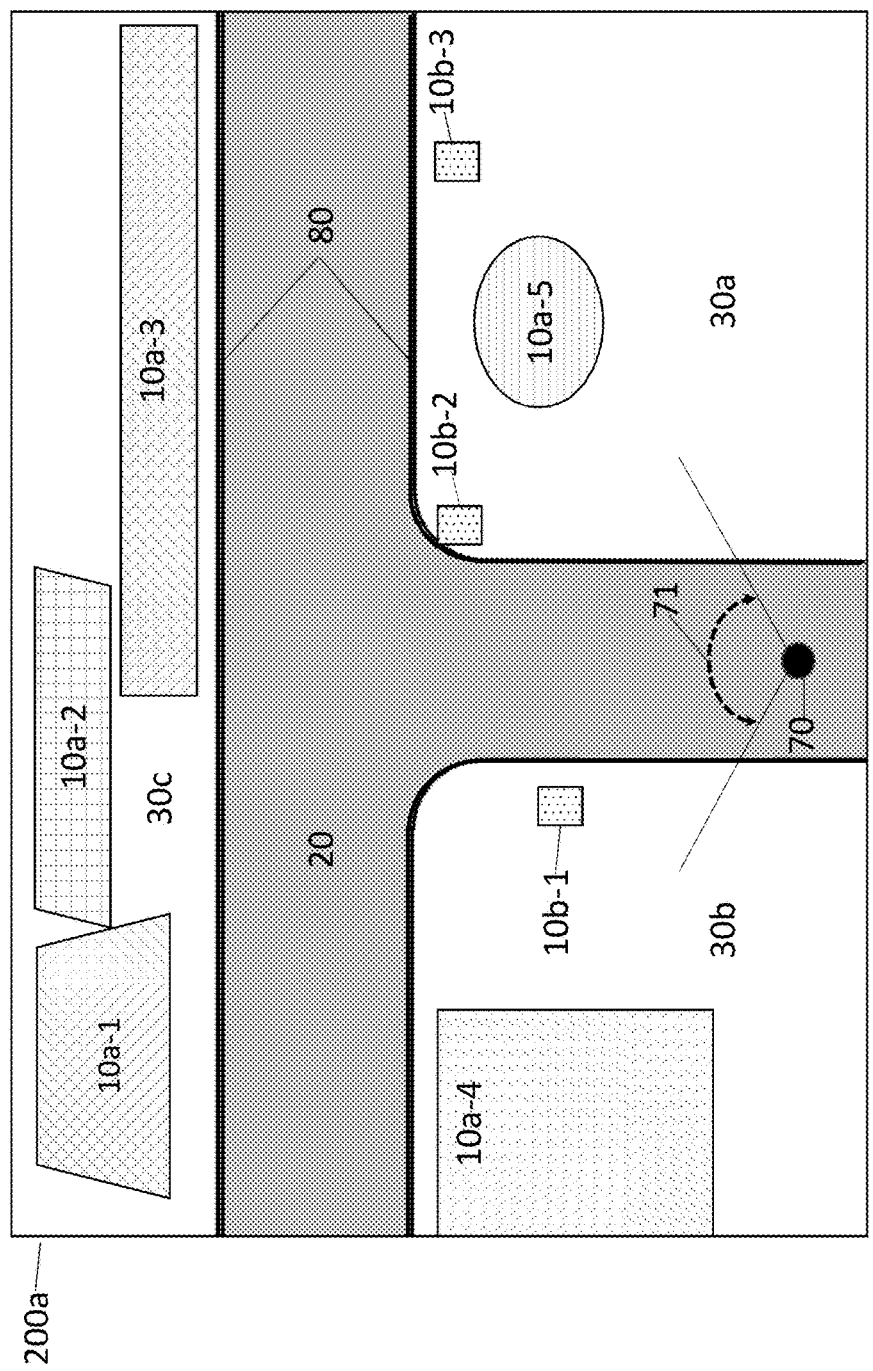
FIG. 2 is a schematic diagram depicting an example of a simulated-environment (SE), which is part of a system for training ML models to identify real-world elements, according to some embodiments.

Reference is now made to FIG. 2, which is a schematic diagram, depicting an example of a simulated-environment (SE) 200a, which is part of a system for training machine-learning (ML) models to identify real-world elements, according to some embodiments.

According to some embodiments, at least one processor (e.g. element 105 of FIG. 1) may be configured to receive (e.g. from an input device such as element 135 of FIG. 1, or from a storage device such as element 130 of FIG. 1) at least one type of a realistic element that corresponds with at least one real-world element. The at least one real-world element may be for example, a pedestrian, a vehicle, road markings, traffic signs, traffic lights, and road shoulders.

Processor 105 may be configured to receive at least one first set (e.g. one or more) of appearance parameters, describing an appearance of the received at least one realistic element. The set of appearance parameters may include, for example: a location, a shape, a size, a color, a texture, a pattern, an orientation and a level of transparency of the realistic element.

In some embodiments, processor 105 may receive (e.g. from an input device such as element 135 of FIG. 1, or from a storage device such as element 130 of FIG. 1) a value for at least one parameter of the at least one first set of appearance parameters. For example: a shape of a realistic element corresponding with an appearance of a real-world object (e.g. a lamp post) may be set according to input from element 135. Alternately, processor 105 may be configured to select (e.g. by performing a random selection) at least one value for at least one appearance parameter from a pre-defined set of values. Pertaining to the same example, processor 105 may set the color (e.g.: blue) of the realistic element from a predefined palette of available colors (e.g.: red, green and blue). In another example, processor 105 may set the location of a realistic element (e.g. a pedestrian) within the SE from a predefined set of available areas (e.g. in a random location on a sidewalk).

For example, the at least one processor may receive parameters describing a traffic pole, including the designed shape of the pole, the number of lights on the pole (e.g.: red, yellow and green lights), the color of the pole, and a location of the pole.

In another example, the at least one processor may receive parameters describing a pedestrian. The parameters may include for example a 2D or 3D shape of a pedestrian (e.g. taken from an image of a real-world pedestrian), a size of the pedestrian, a location and orientation of the pedestrian, at least one color of at least one portion of the pedestrian (e.g.: color of their clothes), etc.

According to some embodiments, at least one processor 105 may generate one or more realistic elements, each corresponding to a variant of at least one real-world element, based on the at least one first set of appearance parameters. For example, processor 105 may generate or create one short, green traffic pole 10b-2 and one tall, blue traffic pole 10b-3. At least one processor 105 may generate a plurality of realistic elements, each corresponding to a different type of real-world element. For example, processor 105 may generate one stop sign 10b-1 element in addition to traffic pole elements 10b-2 and 10b-3.

According to some embodiments, at least one processor 105 may generate at least one realistic element that is a realistic-portion or area 20, corresponding to a real-world area. For example: consider an ML model configured to identify a road. Processor 105 may create realistic-portion 20 which may be a road portion, corresponding to a real-world road (e.g. road portion 20 may be filled by one or more portions of images of a real-world road). Alternately, at least one processor 105 may define realistic-portion 20 according to location of other realistic elements. For example: processor 105 may generate road shoulders 80 and define the realistic-portion 20 of a road according to the location of road shoulders 80.

According to some embodiments, at least one processor 105 may be configured to receive at least one second set of appearance parameters, describing an appearance of at least one abstract-element, and generate one or more abstract elements according to the at least one second set of appearance parameters. For example, processor 105 may generate a plurality of two-dimensional (2D) or three-dimensional (3D) polygons (e.g.: elements 10a-1, 10a-2, 10a-3 and 10a-4), and randomly shaped elements (e.g.: element 10a-5), each associated with respective appearance parameters, the parameters including for example: a location, a shape, a size, a color, a texture, a pattern, an orientation and a level of transparency.

In some embodiments, processor 105 may receive (e.g. from an input device such as element 135 of FIG. 1, or from a storage device such as element 130 of FIG. 1) a value for at least one parameter of the second set of appearance parameters. For example: a shape of an abstract element corresponding with an appearance of a real-world object (e.g.: a shrub, a pile of rubbish, etc.) may be set according to input from element 135. Alternately, processor 105 may be configured to select a random value to at least one appearance parameter of the second set of appearance parameters. For example, processor 105 may set a random color and shape to an abstract element that corresponds with a tree in the real world.

According to some embodiments, at least one processor 105 may be configured to generate one or more abstract elements that are abstract portions (e.g.: elements 30a, 30b and 30c), corresponding to a real-world area.

Pertaining to the above example of an ML model configured to identify a road: abstract portions 30a, 30b and 30c may represent abstractions of real-world sidewalks. They may be presented in a wide variety of appearance parameters (e.g. colors, lighting, shading, textures, etc.). According to experimental results, such variety of abstract 'sidewalk' representations may assist system 100 to efficiently generalize abstract portions 30a, 30b and 30c as "non-road" portions, and identify realistic portion 20 as a road.

Alternately, at least one processor 105 may define abstract portions 30a, 30b and 30c according to location of realistic elements. For example: processor 105 may generate road shoulders 80, and define abstract portions 30a, 30b and 30c of sidewalks according to the location of road shoulders 80.

According to some embodiments, generating one or more abstract elements may include applying real-world images (e.g.: images of real-world buildings and sceneries), or portions thereof on the one or more abstract elements. For example: abstract objects may be constructed as 3D polygons, having a texture or a cover of respective real-world images.

According to some embodiments, at least one processor 105 may be configured to set a at least one parameter of the at least one second set of appearance parameters to values to generate a variety of abstract elements. In some embodiments, processor 105 may receive from an input device (e.g. element 135 of FIG. 1) a value for at least one parameter of the at least one second set of appearance parameters. Alternately, processor 105 may set a at least one parameter of the at least one second set of appearance parameters as a random value.

For example, processor 105 may generate at least one abstract-element by for example receiving from input device 135 a list consisting one or more shapes, and randomly select one shape of the list of shapes; randomly selecting a hue value from a range of hue values (e.g. 0-255); setting a size for the element (e.g. setting a width, height and depth values in voxels for the element); and randomly selecting a location for the abstract-element within the SE (e.g. select X, Y and Z coordinates for locating the element within the SE), etc.

According to some embodiments, at least one processor 105 may be configured to generate or create at least one SE, and place the one or more realistic elements and abstract elements within the SE. The SE may include at least one realistic-portion 20 and at least one abstract portion (e.g.: elements 30a, 30b, 30c).

According to some embodiments, at least one processor 105 may place or add at least one realistic element and at least one abstract-element within the SE. For example: Processor 105 may place at least one realistic element (e.g. 10b-1) and at least one abstract-element (e.g. 10a-1) according to a location parameter of a set of appearance parameters associated with the respective elements.

Alternately, processor 105 may place elements within realistic portions and/or abstract portions of the SE, for example in the sense of placing the elements on a 2D projection (e.g. a map) of the SE, as depicted in FIG. 2. For example:

Processor 105 may place realistic elements within realistic-portion 20, and abstract-elements within abstract portion (e.g.: elements 30a, 30b, 30c).

Processor 105 may place the elements in a random location within the SE.

Processor 105 may place the elements in a random location within the SE, according to at least one probability distribution function (e.g.: place realistic elements within realistic-portion 20 according to a first probability, place realistic elements within abstract portion 30a according to a second probability, place abstract-elements within a realistic-portion 20 according to a third probability, and place abstract-elements within abstract portion 30a according to a fourth probability).

Processor 105 may place realistic elements partially in realistic-portions, and partially in abstract portions.

Processor 105 may place abstract-elements partially in realistic-portions, and partially in abstract portions.

Figure 3:
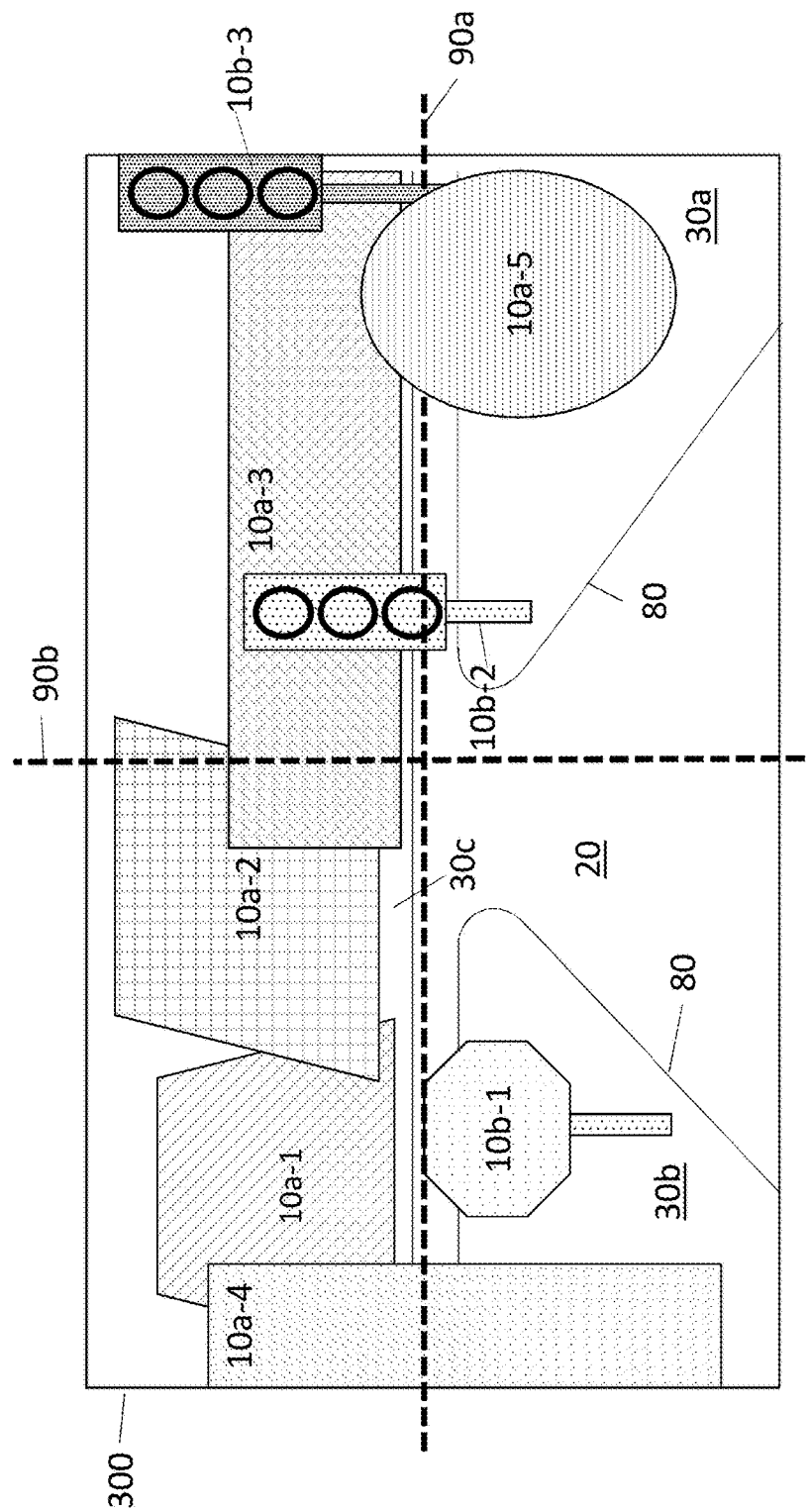
FIG. 3 is a schematic diagram depicting an example of a synthetic image produced according to the SE, and propagated to an ML model, according to some embodiments.

According to some embodiments, at least one processor 105 may work as a synthetic data generator: processor 105 may be configured to generate, create or produce at least one synthetic image from the SE, relating to at least one predefined point-of-view (POV) 70, and at least one field-of-view (FOV) 71 within the SE, as known by persons skilled in the art of computer graphics. According to some embodiments, at least one processor 105 may produce a plurality of synthetic images, each associated with a different POV 70 and/or a different FOV 71. Reference is now made to FIG. 3, which is schematic diagram, depicting an example of a synthetic-image 300 produced according to the SE depicted in FIG. 2, in respect to point-of-view 70, and FOV 71.

According to some embodiments, at least one synthetic-image 300 may be propagated to a machine learning (ML) model. The at least one synthetic-image 300 may be used by the ML model to train to identify at least one real-world element in synthetic-image 300 that corresponds to or describes at least one realistic element in the SE. For example, the ML model may be configured to identify element 10b-1 as a stop sign, and element 80 as road shoulders.

According to some embodiments, the at least one synthetic-image 300 may be used by the ML model to train to identify at least one free-space portion in synthetic-image 300 that corresponds to at least one realistic-portion 20 in the SE. For example, the ML model may be configured to identify realistic-portion 20 as a road.

According to some embodiments the ML model may include any type of model that may be suitable for identification of real-world elements from at least one presented image, including for example, any type of neural-network (NN) models.

According to some embodiments, at least one processor may execute any type of NIL training algorithm on the ML model, that may be suitable for identification of real-world elements from at least one presented image, including for example, supervised ML algorithms, semi-supervised ML algorithms, and the like.

According to some embodiments, ML model may be trained on a first group consisting a plurality of SEs, and may be tested on a second group, consisting of at least one other SE.

According to some embodiments, at least one processor 105 may be configured to automatically label or tag the at least one realistic element that the processor has created, during the generation of the at least one realistic element, as corresponding to the at least one real-world element. This tag or label may be propagated to the ML model, to assist the ML model in the classification of realistic elements.

For example, realistic elements of the SE may be automatically tagged, during their generation, as belonging to a specific type, including for example: pedestrians, vehicles, road markings, traffic signs, traffic lights and road shoulders. The tags may be propagated to the ML model along with synthetic-image 300 and may be used by the ML model to train it to generalize tagged realistic elements and identify varieties of realistic elements in synthetic-image 300 as corresponding to at least one real-world element. For example: short, green traffic pole 10b-2 and tall, blue traffic pole 10b-3 may both be tagged, labelled or described as a "traffic pole" element, and the ML model may consequently generalize a classification of traffic poles to include at least the two types of traffic poles.

According to some embodiments, at least one processor 105 may be configured to tag or label at least one realistic element that is a realistic-portion. For example, at least one processor 105 may tag element 20 as a road. The tags may be propagated to the ML model along with synthetic-image 300 and may be used by the ML model to train it to generalize tagged realistic-portions and identify varieties of realistic-portions in synthetic-image 300 as corresponding to free-space areas in a real-world, non-simulated environment. For example: different varieties of element 20 may be tagged as 'road' elements. Such varieties may include, for example: varieties in color, shape, shading texture etc. The ML model may consequently generalize a classification of such 'road' elements to identify different kinds of roads in the real world.

According to some embodiments, at least one processor 105 may be configured to place at least one abstract element, completely or partially in a realistic portion of the SE, as explained above, and tag the at least one abstract-element as an 'obstruction'. For example, realistic-portion 20 may correspond to a real-world free-space portion such as a road, and the at least one abstract-element located within realistic-portion 20 may correspond to an obstruction, that is an amorphous pile of rubbish, dumped on the road. According to experimental results, as the variety of such obstructions in the real world is very large, it has been observed that presenting obstructions to the ML model as tagged abstract-elements may improve the identification and generalization of 'obstruction' elements that are partially or completely placed within the realistic-portion.

According to some embodiments, tagged elements may include at least one pseudo-realistic element, including at least one realistic-segment and at least one abstract-segment. At least one processor 105 may apply a random value to at least one appearance parameter associated with an abstract segment of the at least one pseudo-realistic element.

For example, element 10a-5 may be a car, including at least one segment that is substantial for the identification of the element as a car (e.g.: four black wheels) and at least one segment that is non-substantial for the identification of the object as a car (e.g.: the car body, which may be of any shape and color). At least one processor 105 may tag or label element 10c as a 'car' element and generate the pseudo-realistic car element by applying a random color to the car body. The random generation of at least one non-substantial segment of the pseudo-realistic element may contribute to generalizing a classification of 'car' elements by the ML model, to include a plurality of car colors.

According to some embodiments, at least one processor 105 may be configured to assess, from synthetic-image 300, a location of at least one realistic element in the SE that corresponds to a real-world element. At least one processor 105 may assess the location of the at least one realistic element (e.g.: 10b-1, 10b-2, 10b-3) according to a list of parameters relating to synthetic-image 300 and including, for example: (a) the size of the realistic element in synthetic-image 300; (b) elevation of a bottom portion of the realistic element (e.g.: 10b-1) in relation to a middle, horizontal line 90a; (c) location of the realistic element (e.g.: 10b-2) in relation to a middle, vertical line 90b; (d) a difference in a location of the realistic element (e.g.: 10b-1) between two different synthetic-images 300; and (e) occlusion of a realistic element (e.g. 10b-3) by another realistic element or by an abstract-element (e.g. 10a-5).

According to some embodiments, at least one processor 105 may be configured to generate or create a reproduction of the SE 200a, that consists at least one realistic element that corresponds with an identified real-world element.

Figure 4:
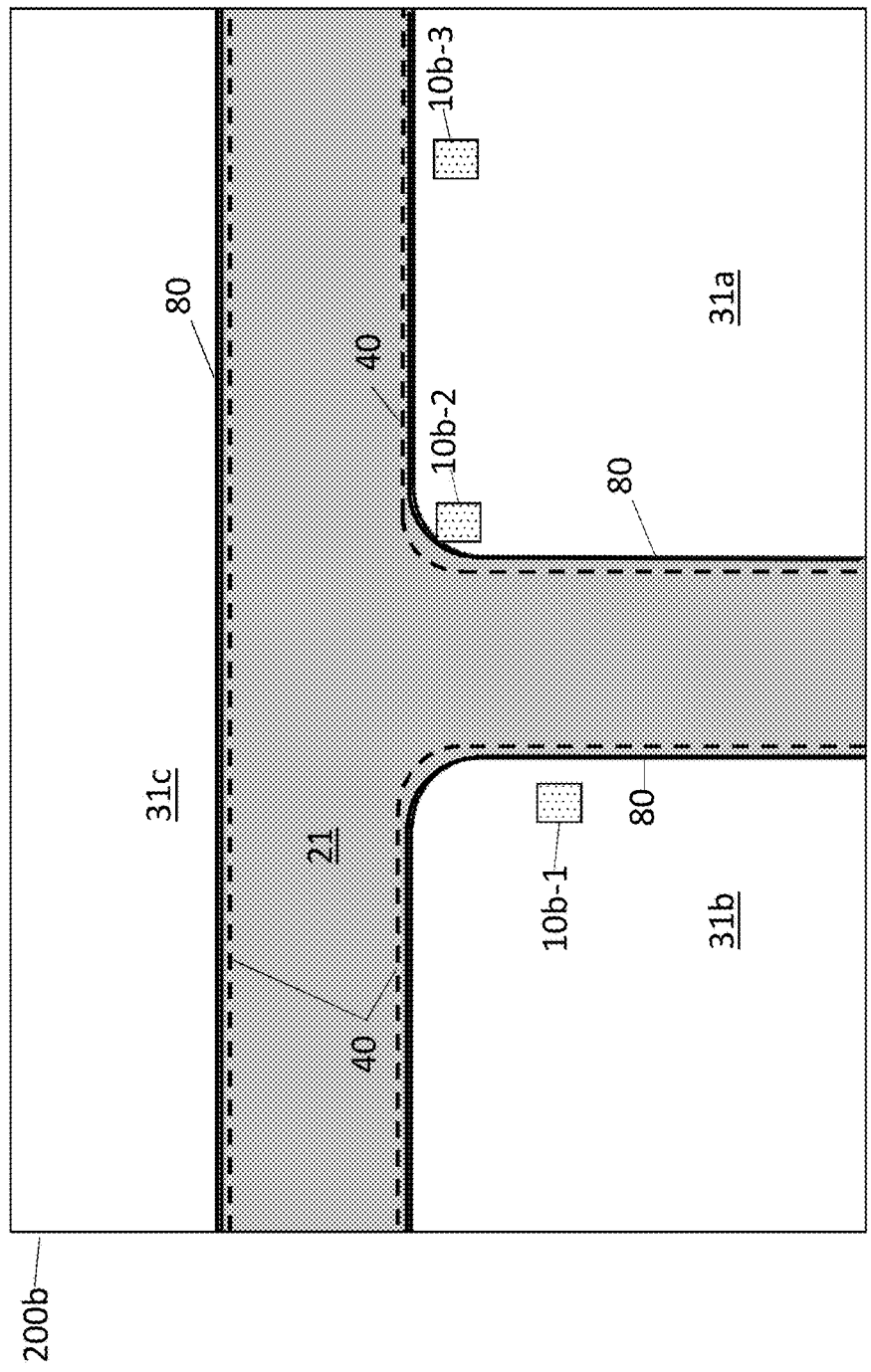
FIG. 4 is a schematic diagram depicting an example of a reproduced SE, including a free-space portion and an occupied-space portion, which may be produced by a system for training ML models, according to some embodiments.

Reference is now made to FIG. 4, which is a schematic diagram, depicting an example of a reproduced SE 200b. According to some embodiments, SE 200b may including at least one realistic element (e.g.: traffic poles 10b-2 and 10b-3, stop sign 10b-1, and road-shoulders 80), at least one free-space portion 21, and at least one occupied-space portion (e.g.: 31a, 31b and 31c).

According to some embodiments, at least one processor 105 may be configured to place or add at least one realistic element within reproduced-SE 200b, according to the assessment of the at least one realistic element's location described above.

According to some embodiments, at least one processor 105 may define at least one area of reconstructed SE 200h as free for passage (e.g. by an autonomous vehicle), herein referred to as a free-space portion, and at least one space that is not free for passage, herein referred to as an occupied-space portion. As shown in FIG. 4, the free-space portion 21 and at least one occupied-space portion (e.g., 31a, 31b and 31c) within the SE, based on the location of the one or more realistic elements within the SE. For example, processor 105 may identify road-shoulders 80, and define a road 21, limited by or bordered by the identified shoulders 80, as a tree-space portion. According to some embodiments, the ML model (e.g. a neural network) may be configured to detect at least one free-space portion and at least one occupied-space portion in a real-world, non-simulated environment based on the at least one SE (e.g. element 200a of FIG. 2).

The term "road delimiter" is used herein to refer to a limit or a border of a free-space portion, in association with a specific autonomous-driving machine.

According to some embodiments, at least one processor 105 may be configured to identify at least one road-delimiter 40 for an autonomous-driving machine, based on the location of one or more identified realistic elements (e.g.: elements 80, 10b-1), and may be configured to define at least one free-space portion 21 and at least one occupied-space portion (e.g. 31a, 31b, 31c) according to the calculated at least one road-delimiter 40.

According to some embodiments, at least one processor 105 may be configured to receive at least one machine parameter, associated with an autonomous driving machine, and calculate at least one road-delimiter 40 based on the location of one or more identified realistic elements (e.g.: elements 80, 10b-1) and the at least one received machine parameter. The at least one machine parameter may include, for example: speed of the machine, steering properties of the machine, size of the machine and shape of the machine.

For example, processor 105 may receive a first set of machine parameters associated with an autonomous-driving private vehicle, driving through a curve in a road, and a second set of machine parameters associated with an autonomous-driving truck, driving through the same curve. Processor 105 may identify elements 80 as corresponding to road shoulders in the real world, determine the location of the road shoulders as explained above, and calculate the location of road delimiters 40 based on the location of elements 80 and at least one machine parameter. As shown in the example of FIG. 4, road delimiters 40 may be identified as lines that are substantially parallel to road shoulders 80, on the road 21. Pertaining to the example of the autonomous private vehicle and autonomous truck, processor 105 may identify a first road delimiter for the private vehicle, and a second road delimiter for the truck, where the second road delimiter may be have a wider gap from the road-shoulder in comparison to the first road delimiter, to constrain the truck to a wider curvature due to its inherent size.

Figure 5:
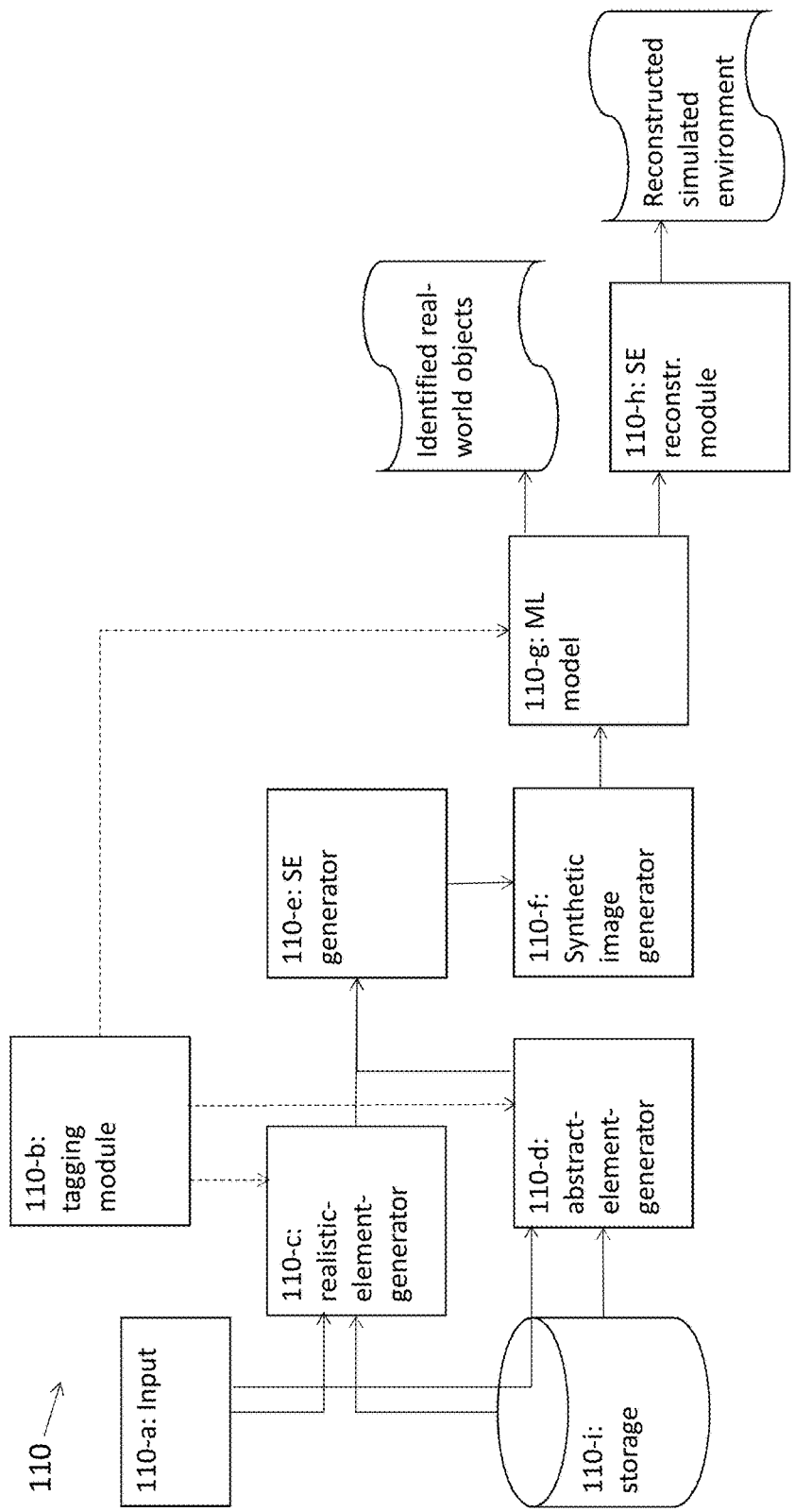
FIG. 5 is a schematic diagram depicting modules of a system of training an ML model to identify real-world elements, according to some embodiments.

Reference is now made to FIG. 5, which is a block diagram depicting modules of a system 110 for training ML models to identify real-world elements, according to some embodiments. The modules of system 110 may be implemented as software modules or hardware modules or any combination thereof and may be executed by at least one processor of at least one computational system (e.g. element 105 of FIG. 1).

As shown in FIG. 5, system 110 may include at least a realistic-element generator 110-c and an abstract-element generator 110-d. in some embodiments, elements 110-c and 110-d may be implemented as a single module.

Modules 110-c and 110-d may receive at least one request from an input module 110-a (e.g. a host processor, user input, element 135 of FIG. 1, etc.) to produce at least one realistic-element and/or at least one abstract-element and/or at least one pseudo-realistic element.

Realistic-element generator 110-c may receive at least one appearance parameter (e.g. a selection of a predefined realistic-element, a shape of an element, a size, a color, etc.) from input module 110-a and/or from storage 110-i (e.g. element 130 of FIG. 1) for producing the requested realistic-element or pseudo-realistic element as a 2D or a 3D object.

Abstract-element generator 110-d may receive at least one appearance parameter (e.g. a selection of a predefined realistic-element, a shape of an element, a size, a color, etc.) from input module 110-a and/or from storage 110-i for producing the requested abstract-element or pseudo-realistic element as a 2D or a 3D object.

Tagging module 110-b may assign a tag or a label to elements produced by realistic-element generator 110-c and abstract-element generator 110-d, during their production. For example, realistic elements may be tagged as representing real-world objects, including for example pedestrians, vehicles, road markings, traffic signs, traffic lights, and road shoulders.

In another example, if modules 110-c and 110-d are requested to generated a pseudo-realistic element such as a car (containing portions that are significant for identification of the element as a car, and other portions that are not significant for that purpose), tagging module may label the element as a 'car', to train ML-model 110-g (e.g. to classify the element as a car).

In another example, tagging module 110-b may tag at least one abstract-object, to train ML model 110-g to identify at least one real-world element that has at least one appearance parameter that is not significant for the purpose of system 110. For example, ML model 110-g may be required to identify an obstruction on a road. However, such an object (e.g. a pile of rubbish, rocks, a fallen tree, etc.) may have any shape or color, and may be characterized solely by its location (e.g. on the road). Experiments show that general tagging of abstract elements as 'obstruction' or 'rubbish' may assist ML module 110-g to efficiently generalize and identify such objects in the real world.

According to some embodiments, system 110 may include an SE-generator module 110-e, configured to produce a 3D or 2D simulated environment. SE-generator module 110-e may receive at least one realistic element and/or at least one abstract element and/or at least one pseudo-realistic element, and place the at least one element within the SE, as known to persons skilled in the art of computer graphics.

According to some embodiments, system 110 may include a synthetic image generator 110-f, configured to produce at least one 2D synthetic image from the SE, relating to at least one FOV and at least one POV, as explained above, in relation to FIG. 3.

The synthetic image may be input into ML model 110-g, which may be any type of model suitable for identification and classification of objects in the real world (e.g. a deep-learning neural network module). ML model 10-g may be trained to identify at least one real world object from the at least one tagged element. ML model 110-g may further be configured to generalize abstract-elements, and identify them as 'garbage' or 'background' objects in the real world.

According to some embodiments, system 110 may further include an SE-reconstruction module 110-h, configured to produce at least one reconstructed SE from the identified real-world objects, as explained above, in relation to FIG. 4.

Figure 6:
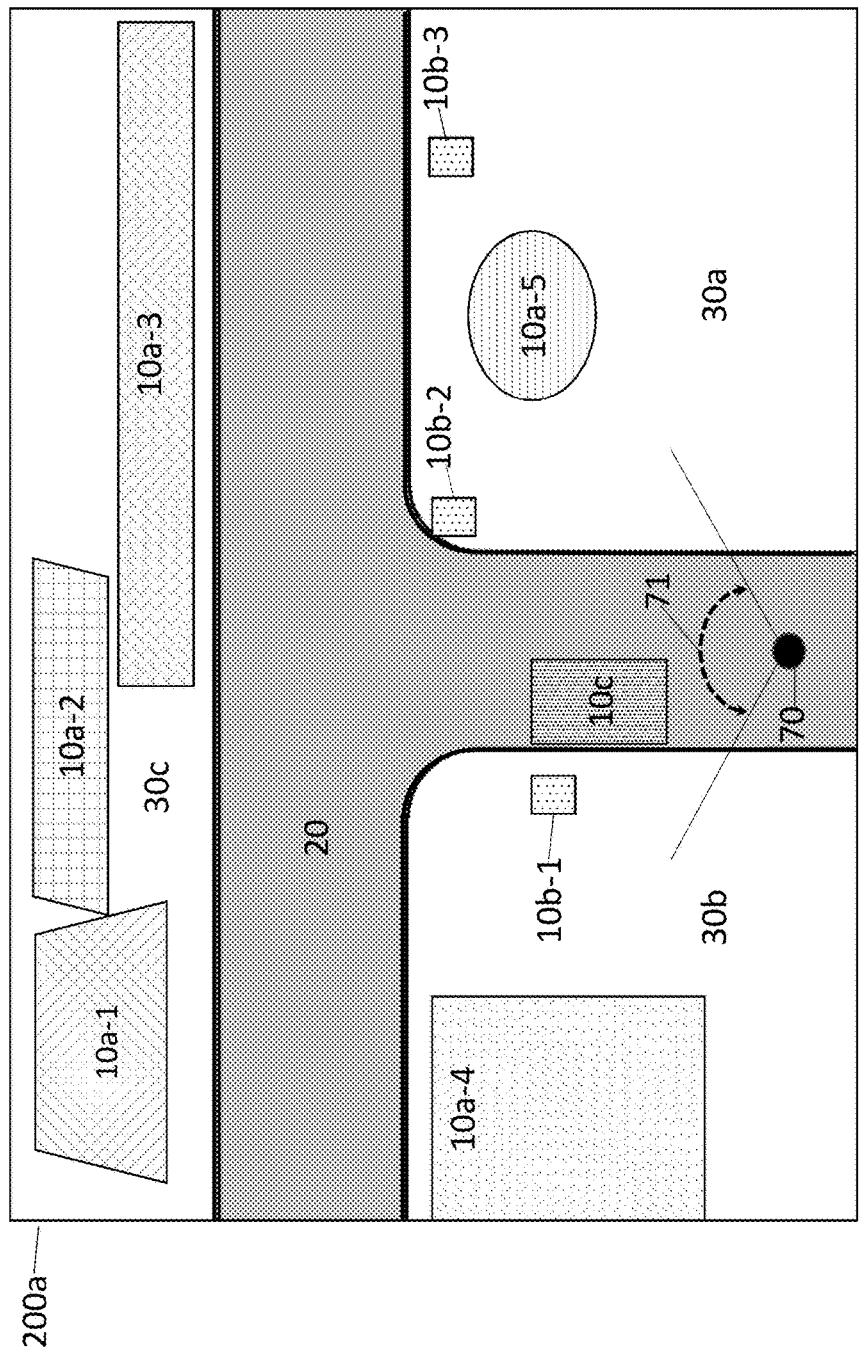
FIG. 6 is a schematic diagram depicting an example of an SE that includes an obstruction element, according to some embodiments.

Reference is now made to FIG. 6, which is a schematic diagram, depicting an example of an SE 200a, which is part of a system for training ML models to identify real-world elements, according to some embodiments. As shown in this figure, the only difference from the SE discussed in relation to FIG. 2 is obstruction element 10c, which has been placed within realistic-portion 20.

According to some embodiments, element 10c may be a realistic element, or a pseudo-realistic element, corresponding to a real-world element, and may be tagged as such. For example, element 10c may be a parked motorcycle, and may be tagged as a "motorcycle" element.

According to some embodiments, element 10c may be an abstract-element, and may be tagged as an "obstruction" element.

Figure 7:
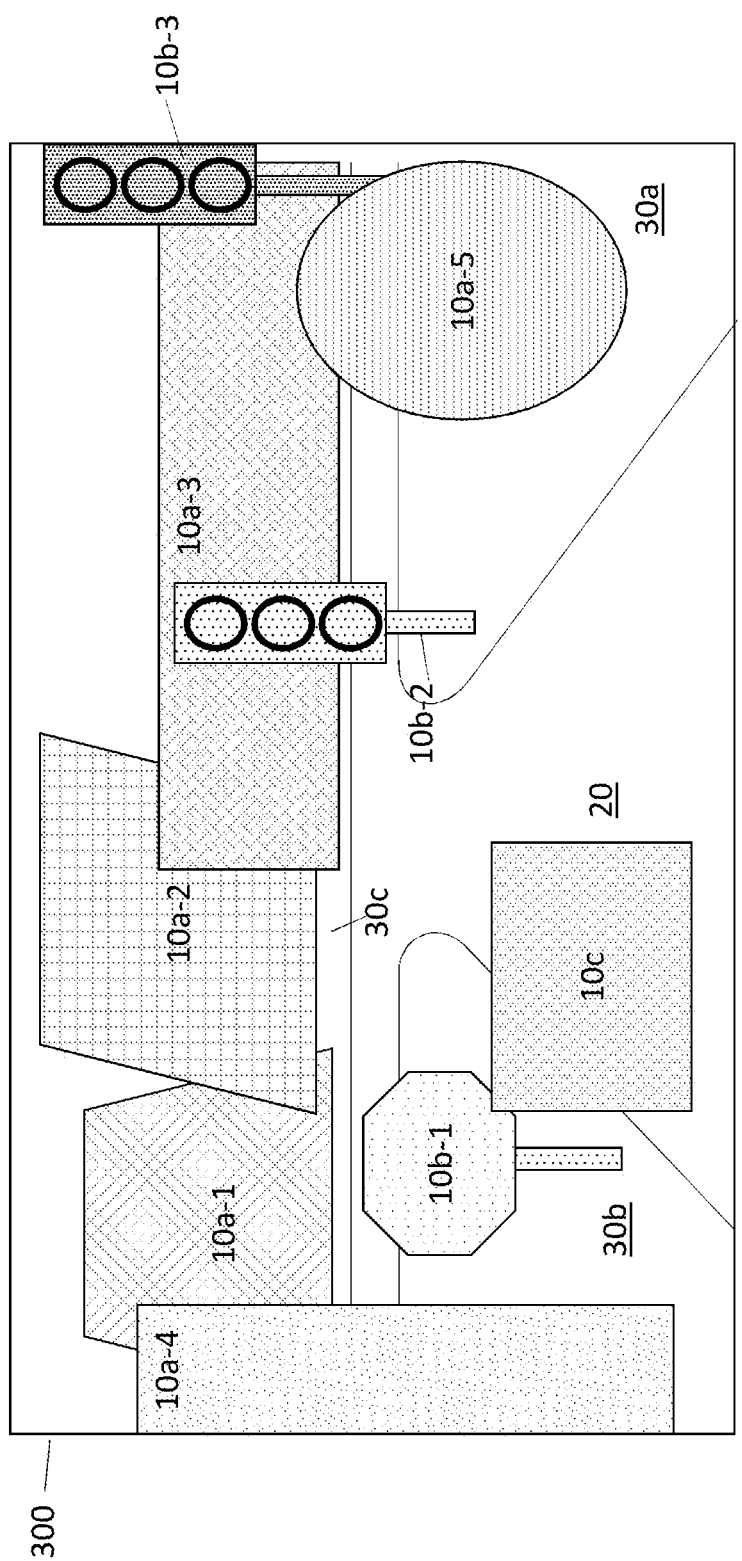
FIG. 7 is a schematic diagram depicting an example of a synthetic image produced according to an SE that includes an obstruction element, according to some embodiments.

Reference is now made to FIG. 7, which is schematic diagram, depicting an example of a synthetic-image 300 produced according to the SE depicted in FIG. 6, in respect to point-of-view 70 and FOV 71. As shown in FIG. 7, element 10c appears in the foreground of synthetic-image 300.

Figure 8:
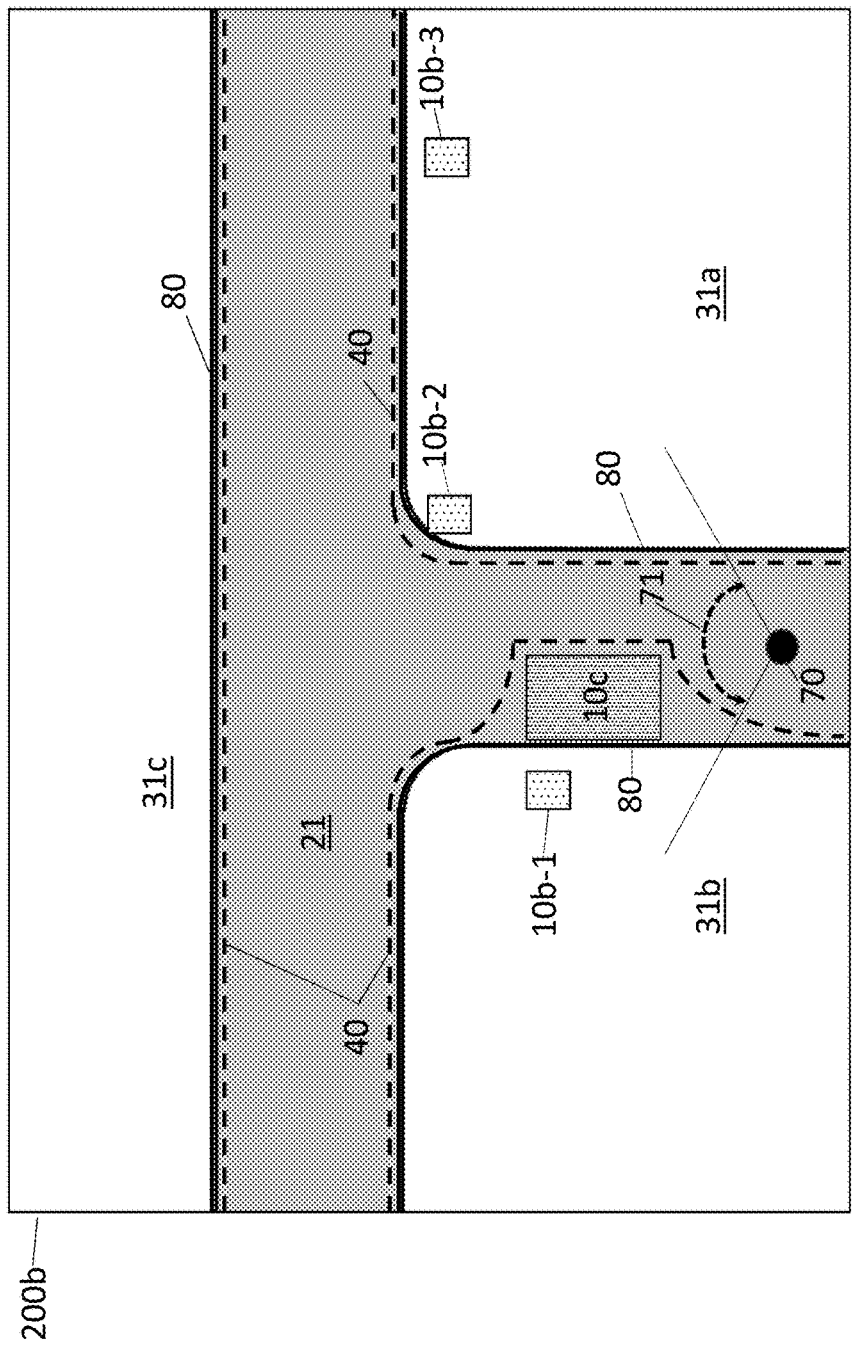
FIG. 8 is a schematic diagram depicting an example of a reproduced SE, according to some embodiments.

Reference is now made to FIG. 8, which is a schematic diagram, depicting an example of a reproduced SE 200b, obtained in a similar manner to that discussed above, in relation to FIG. 4. As shown in FIG. 8, element 10c is located within free-space portion 21 (e.g. on the road). According to some embodiments, at least one processor 105 may be configured to redefine road-delimiter 40 to exclude obstruction element 10c from the free-space portion.

Figure 9:
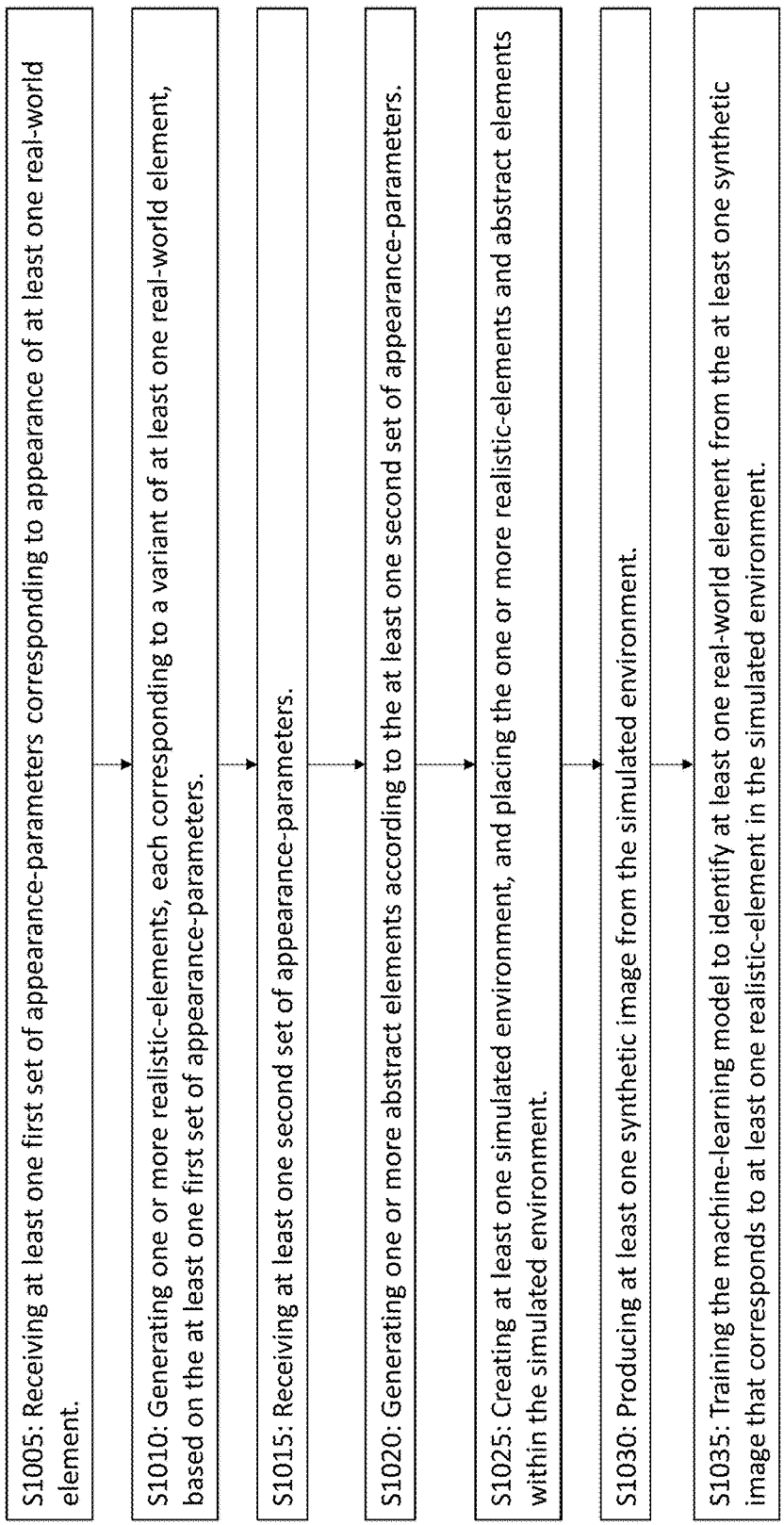
FIG. 9 is a flow diagram depicting a method for training ML models to identify real-world elements, according to some embodiments.

Reference is now made to FIG. 9 which is a flow diagram depicting a method for training ML models to identify real-world elements, according to some embodiments.

In step S1005, at least one processor may receive (e.g. from a storage unit such as element 135 of FIG. 1 or from a user input module, such as element 135 of FIG. 1) at least one first set of appearance parameters corresponding to the appearance of at least one real-world element.

In step S1010, the at least one processor may generate one or more realistic elements, each corresponding to a variant of at least one real-world element, based on the at least one first set of appearance parameters. For example, a plurality of elements representing a variety of lamp posts (e.g. of different height and of different color) may be generated.

In step S1015, the at least one processor may receive at least one second set of appearance parameters;

In step S1020, the at least one processor may generate one or more abstract elements according to the at least one second set of appearance parameters. For example, if the ML model is configured to identify a road, the processor may generate at least one abstract element that corresponds to a physical element in the real world, which is not significant for the identification of the road (e.g. a tree or a building in the background).

In step S1020, the at least one processor may create at least one SE, and may place the one or more realistic elements and abstract elements within the SE. For example, the processor may locate the elements within the SE according to at least one parameter of the first and/or second set of appearance parameters;

in step S1025, the at least one processor may produce at least one synthetic image from the SE. For example, a synthetic image may be produced from the SE based on at least one point-of-view and in relation to at least one field-of-view.

In step S1030, the at least one processor may provide the at least one synthetic image to a machine-learning model (e.g. a deep learning neural network model).

In step S1035, the at least one processor may train the machine-learning model to identify at least one real world element from the at least one synthetic image that corresponds to at least one realistic element in the SE. For example, the ML model may identify realistic elements (e.g. traffic signs) and realistic portions (e.g. areas such as a road and/or a sidewalk) corresponding to real world elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of training a machine-learning model to identify real-world elements using a simulated environment (SE), the method comprising:
receiving, by at least one processor, at least one first set of appearance parameters corresponding to the appearance of at least one real-world element;
generating, by the at least one processor, one or more realistic elements, each corresponding to a variant of at least one real-world element, based on the at least one first set of appearance parameters;
receiving, by the at least one processor, at least one second set of appearance parameters;
generating, by the at least one processor, one or more abstract elements according to the at least one second set of appearance parameters, wherein generating each of the one or more abstract elements further comprises applying a random value to at least one parameter of the at least one second set of appearance parameters to generate a variety of abstract elements;
creating, by the at least one processor, at least one SE, and placing the one or more realistic elements and abstract elements within the SE;
producing by the at least one processor at least one synthetic image from the SE;
providing the at least one synthetic image to a machine-learning model;
training the machine-learning model to identify at least one real world element from the at least one synthetic image that corresponds to at least one realistic element in the SE; and
calculating, by the at least one processor, at least one road delimiter through the free space portion of the SE, based on the location of at least one identified realistic element.

2. The method of claim 1, wherein at least one synthetic image is produced from the SE based on at least one point-of-view and in relation to at least one field-of-view.

3. The method of claim 2, wherein generating one or more variants of abstract elements includes applying real-world images, or portions thereof, on the one or more variants of the abstract elements.

4. The method of claim 1, further comprising: tagging, by the at least one processor, the one or more elements as corresponding to the at least one real-world element; and training the machine-learning model to generalize the plurality of tagged elements, and identify at least one element in the SE as corresponding to at least one real-world element.

5. The method of claim 4, wherein the tagged elements are realistic elements, and are selected from a group consisting one or more of: pedestrians, vehicles, road markings, traffic signs, traffic lights, and road shoulders.

6. The method of claim 4, wherein at least one tagged element comprises at least one pseudo-realistic element, consisting of at least one substantial portion and at least one non-substantial portion, and wherein generating at least one pseudo-realistic element further comprises applying a random value to at least one appearance parameter associated with a non-substantial portion of the at least one realistic element.

7. The method of claim 1, further comprising identifying, by the at least one processor, at least one free-space portion and at least one occupied-space portion within the SE, based on the at least one calculated road-delimiter within the SE.

8. The method of claim 7, further comprising: placing by the at least one processor at least one element within a free-space portion of the SE; tagging the at least one element as an obstruction; and redefining the road-delimiter to exclude the obstruction from the free-space portion.

9. The method of claim 1, wherein the at least one first and second sets of appearance parameters comprises at least one of: a location, a shape, a size, a color, a texture, a pattern, an orientation and a level of transparency.

10. A method of training a neural network using a simulated environment (SE), the method comprising:
creating at least one realistic element and at least one abstract element, wherein at least one realistic element is a realistic-portion, corresponding to at least one free-space in a non-simulated environment, and wherein at least one abstract-element is an abstract portion, corresponding to at least one occupied-space in a non-simulated environment and placing the elements in the SE;

creating at least one synthetic image from the at least one SE;

providing the at least one synthetic image to a neural network;

training the neural network, to detect at least one free-space portion and at least one occupied-space portion in the SE, respectively corresponding to at least one free-space and at least one occupied-space in a non-simulated environment, based on the at least one synthetic image; and tagging at least one realistic-portion within the SE, and wherein training the neural network, to detect at least one free-space portion and at least one occupied-space portion in the non-simulated environment, comprises training the neural-network to generalize the at least one tagged realistic-portion to detect at least one corresponding free-space in a non-simulated environment.

11. The method of claim 10, wherein at least one abstract element comprises a random shape, having at least one randomly selected appearance-parameter, selected from a list consisting of: one or more colors, one or more textures, one or more patterns, one or more orientation, one or more portion of a real-world image and one or more transparency levels.

12. The method of claim 10, further comprising:
tagging at least one realistic element as corresponding to at least one realistic real-world element, selected from a group consisting of: pedestrians, vehicles, road markings, traffic signs, traffic lights, and road shoulders; and
training the neural network to generalize the least one tagged realistic element to identify corresponding elements in a non-simulated environment.

13. The method of claim 10, further comprising:
placing at least one part of an abstract-element within a realistic-portion;
tagging the at least one abstract-element as an obstruction; and
training the neural network to generalize the at least one tagged abstract-element to detect corresponding elements in a non-simulated environment.

14. The method of claim 10, wherein the tagged elements comprise at least one pseudo-realistic element, wherein the at least one pseudo-realistic element comprises a realistic segment and an abstract segment, and wherein the method further comprises applying a random value to at least one appearance parameter associated with the abstract segment of the at least one pseudo-realistic element.

15. The method of claim 10 further comprising: generating at least one other SE and checking the trained neural network on the other SE.

16. A system for training a machine-learning model to identify real-world elements using a simulated environment (SE), the system comprising:
a memory; and
a processor configured to:
receive at least one first set of appearance parameters corresponding to the appearance of at least one real-world element;
generate one or more realistic elements, each corresponding to a variant of at least one real-world element, based on the at least one first set of appearance parameters;
receive at least one second set of appearance parameters;
generate one or more abstract elements according to the at least one second set of appearance parameters, wherein generating each of the one or more abstract elements further comprises applying a random value to at least one parameter of the at least one second set of appearance parameters to generate a variety of abstract elements;
create at least one SE, and placing the one or more realistic elements and abstract elements within the SE;
produce at least one synthetic image from the SE;
provide the at least one synthetic image to a machine-learning model;
train the machine-learning model to identify at least one real-world element from the at least one synthetic image that corresponds to at least one realistic element in the SE; and
calculating at least one road delimiter through the free space portion of the SE, based on the location of at least one identified realistic element.

17. The system of claim 16, wherein the system has a distributed architecture, comprising a plurality of processors, and wherein execution of the modules of executable code is performed by at least two of the plurality of processors.

* * * * *